(12) United States Patent
Baek et al.

(10) Patent No.: US 8,865,329 B2
(45) Date of Patent: Oct. 21, 2014

(54) SECONDARY BATTERY PACK OF NOVEL STRUCTURE

(75) Inventors: Juhwan Baek, Chungcheongbuk-do (KR); Sangkwon Nam, Cheongju-si (KR); Sukjin Song, Seoul (KR); Tae-Wook Kim, Chungcheongbuk-do (KR); Jinhyun Ryu, Cheongju-si (KR)

(73) Assignee: LG Chem, Ltd., Seoul (KR)

( * ) Notice: Subject to any disclaimer, the term of this patent is extended or adjusted under 35 U.S.C. 154(b) by 664 days.

(21) Appl. No.: 13/201,670

(22) PCT Filed: Feb. 24, 2010

(86) PCT No.: PCT/KR2010/001136
§ 371 (c)(1),
(2), (4) Date: Oct. 28, 2011

(87) PCT Pub. No.: WO2010/098571
PCT Pub. Date: Sep. 2, 2010

(65) Prior Publication Data
US 2012/0040209 A1    Feb. 16, 2012

(30) Foreign Application Priority Data

Feb. 26, 2009  (KR) .................. 10-2009-0016550

(51) Int. Cl.
*H01M 14/00*   (2006.01)
(Continued)

(52) U.S. Cl.
CPC *H01M 2/34* (2013.01); *Y02E 60/12* (2013.01); *H01M 10/425* (2013.01);

(58) Field of Classification Search
USPC ............ 429/7, 58, 164, 170; 29/623.1, 623.2, 29/623.4
See application file for complete search history.

(56) References Cited

U.S. PATENT DOCUMENTS 6,803,144 B2 * 10/2004 Hovi et al. .................... 429/123
(Continued)

FOREIGN PATENT DOCUMENTS

CN    1914749 A    2/2007
CN    1985387 A    6/2007
(Continued)

OTHER PUBLICATIONS

International Search Report for PCT/KR2010/001136 dated Sep. 17, 2010.

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

Disclosed herein is a secondary battery pack including a battery cell including first and second electrode terminals of specific structures, a protection circuit module (PCM) including connection members A and B connected to the first and second electrode terminals and an electrically insulated top cap, wherein a connection portion of the connection member B connected to the second electrode terminal of the battery cell is located at the bottom of the PCB so that the connection member B is electrically connected to the second electrode terminal via the safety element, the connection member A is coupled to the bottom of the PCB in a state in which the connection member A protrudes from one end of the PCB in the lateral direction so that a connection portion of the connection member A connected to the first electrode terminal of the battery cell is exposed through a corresponding one of the through holes formed at the top cap, a coupling hole is formed at the protruding portion of the connection member A, and wherein coupling members are coupled into the respective coupling grooves of the battery cell through the through holes of the top cap in a state in which the PCM and the top cap are disposed at the top of the battery cell, and the connection member A is mechanically coupled and electrically connected to the first electrode terminal by a corresponding one of the coupling members.

16 Claims, 4 Drawing Sheets

(51) Int. Cl.
  *H01M 10/34*  (2006.01)
  *H01M 10/52*  (2006.01)
  *H01M 2/02*  (2006.01)
  *H01M 6/08*  (2006.01)
  *H01M 4/82*  (2006.01)
  *H01M 6/00*  (2006.01)
  *H01M 10/42*  (2006.01)
  *H01M 2/22*  (2006.01)
  *H01M 2/34*  (2006.01)
  *H01M 2/04*  (2006.01)
  *H01M 10/052*  (2010.01)

(52) U.S. Cl.
  CPC ............... *H01M 2/22* (2013.01); *H01M 2/348* (2013.01); *H01M 2/0285* (2013.01); *H01M 10/052* (2013.01); *H01M 2200/106* (2013.01); *H01M 2/0404* (2013.01)
  USPC ............... 429/7; 429/58; 429/164; 429/170; 29/623.1; 29/623.2; 29/623.4

(56) References Cited

U.S. PATENT DOCUMENTS

| | | | |
|---|---|---|---|
| 7,037,608 B2 * | 5/2006 | Nishimura et al. | 429/7 |
| 7,939,189 B2 | 5/2011 | Kim et al. | |
| 8,709,623 B2 * | 4/2014 | Choi et al. | 429/7 |
| 2006/0019531 A1 | 1/2006 | Moon | |
| 2006/0210870 A1 | 9/2006 | Moon et al. | |
| 2007/0160878 A1 | 7/2007 | Kim et al. | |
| 2007/0188132 A1 | 8/2007 | Kim et al. | |
| 2007/0202364 A1 | 8/2007 | Uh et al. | |
| 2008/0107964 A1 | 5/2008 | Choi | |
| 2008/0233472 A1 | 9/2008 | Ota et al. | |

FOREIGN PATENT DOCUMENTS

| | | |
|---|---|---|
| CN | 101069301 A | 11/2007 |
| JP | 2007-234586 A | 9/2007 |
| JP | 2008-103324 A | 5/2008 |
| KR | 10-2007-0043537 A | 4/2007 |
| KR | 10-0879894 B1 | 1/2009 |

* cited by examiner

SECONDARY BATTERY PACK OF NOVEL STRUCTURE

TECHNICAL FIELD

The present invention relates to a secondary battery pack of a novel structure, and, more particularly, to a secondary battery pack including a battery cell configured to have a structure in which an electrode assembly of a cathode/separator/anode structure is mounted in a battery case together with an electrolyte in a sealed state, the battery case is provided at the top thereof with a first electrode terminal, a second electrode terminal and a pair of coupling grooves, one of the coupling grooves is formed at the first electrode terminal, and the second electrode terminal protrudes from the center of the top of the battery case, a protection circuit module (PCM) including a printed circuit board (PCB) having a protection circuit formed thereon, connection members A and B connected to the first electrode terminal and the second electrode terminal, respectively, and a safety element, and an electrically insulated top cap mounted to the top of the battery cell so as to surround the PCM, the top cap having through holes communicating with the respective coupling grooves, wherein the connection member A is coupled to the bottom of the PCB in a state in which the connection member A protrudes from one end of the PCB in the lateral direction so that a connection portion of the connection member A connected to the first electrode terminal of the battery cell is exposed through a corresponding one of the through holes formed at the top cap, a coupling hole is formed at the protruding portion of the connection member A, and a connection portion of the connection member B connected to the second electrode terminal of the battery cell is located at the bottom of the PCB so that the connection member B is electrically connected to the second electrode terminal via the safety element, and wherein coupling members are coupled into the respective coupling grooves of the battery cell through the through holes of the top cap in a state in which the PCM and the top cap are disposed at the top of the battery cell, and the connection member A is mechanically coupled and electrically connected to the first electrode terminal by a corresponding one of the coupling members.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as for the mobile devices.

However, various combustible materials are contained in the lithium secondary battery. As a result, there is a possibility of danger in that the lithium secondary battery will be heated or explode due to overcharge, overcurrent or any other external physical impacts. In other words, the lithium secondary battery has low safety. Consequently, safety elements, such as a positive temperature coefficient (PTC) element and a protection circuit module (PCM), to effectively control an abnormal state of the lithium secondary battery, such as overcharge or overcurrent, are mounted in the lithium secondary battery in a state in which the safety elements are connected to a battery cell of the lithium secondary battery.

Generally, the PCM is connected to the battery cell via conductive nickel plates by welding or soldering. That is, nickel plates are connected to electrode tabs of the PCM by welding or soldering, and then the nickel plates are connected to electrode terminals of the battery cell by welding or soldering. In this way, the PCM is connected to the battery cell, thereby manufacturing a battery pack.

It is necessary for safety elements, including such a PCM, to be maintained in electrical connection with electrode terminals of a battery cell and, at the same time, to be electrically isolated from other parts of the battery cell. A plurality of insulative mounting members or a plurality of parts is necessary to achieve such connection with the result that a process of assembling a battery pack is complicated, and the size of a space to receive the battery cell is reduced.

Also, a plurality of welding or soldering processes is required to constitute a battery pack. Such welding processes must be carried out with high precision because the structure of the secondary battery is very small with the result that a defect ratio may be increased. Furthermore, such processes are added to manufacture a product with the result that manufacturing cost of the product is increased.

Therefore, it is possible to modify the upper structure of the battery cell so that the electrode terminals can be mechanically coupled and electrically connected to the PCM. In this case, it is possible to reduce the number of parts disposed at the top of the battery cell and to manufacture a battery pack in a structure in which the PCM and the top cap are sequentially connected to the protruding electrode terminals.

However, the structure in which the electrode terminals are modified requires the battery cell to be newly designed. For this reason, a conventional battery cell manufacturing process and a conventional battery pack manufacturing process must be changed with the result that the manufacturing cost is increased.

Consequently, there is a high necessity for technology to reduce the number of members mounted to the top of the battery cell while using a conventional battery cell and maximally utilizing a conventional assembly method, thereby simplifying an assembly process, to reduce the number of welding processes, thereby minimizing a defect ratio during the assembly of battery cells, to achieve stable coupling between members disposed at the top of the battery cell, and to increase the capacity of the battery cell.

DISCLOSURE

Technical Problem

Therefore, the present invention has been made to solve the above problems, and other technical problems that have yet to be resolved.

Specifically, it is an object of the present invention to provide a secondary battery pack configured to have a structure in which the number of parts necessary to manufacture the battery pack is reduced, a process of assembling the battery pack is simplified, thereby reducing the manufacturing cost of the battery pack.

It is another object of the present invention to provide a secondary battery pack configured to have a structure in which the battery pack is manufactured maximally using a conventional battery cell and a conventional assembly method.

Technical Solution

In accordance with one aspect of the present invention, the above and other objects can be accomplished by the provision of a secondary battery pack including a battery cell configured to have a structure in which an electrode assembly of a cathode/separator/anode structure is mounted in a battery case together with an electrolyte in a sealed state, the battery case is provided at the top thereof with a first electrode terminal, a second electrode terminal and a pair of coupling grooves, one of the coupling grooves is formed at the first electrode terminal, and the second electrode terminal protrudes from the center of the top of the battery case, a protection circuit module (PCM) including a printed circuit board (PCB) having a protection circuit formed thereon, connection members A and B connected to the first electrode terminal and the second electrode terminal, respectively, and a safety element, and an electrically insulated top cap mounted to the top of the battery cell so as to surround the PCM, the top cap having through holes communicating with the respective coupling grooves, wherein the connection member A is coupled to the bottom of the PCB in a state in which the connection member A protrudes from one end of the PCB in the lateral direction so that a connection portion of the connection member A connected to the first electrode terminal of the battery cell is exposed through a corresponding one of the through holes formed at the top cap, a coupling hole is formed at the protruding portion of the connection member A, and a connection portion of the connection member B connected to the second electrode terminal of the battery cell is located at the bottom of the PCB so that the connection member B is electrically connected to the second electrode terminal via the safety element, and wherein coupling members are coupled into the respective coupling grooves of the battery cell through the through holes of the top cap in a state in which the PCM and the top cap are disposed at the top of the battery cell, and the connection member A is mechanically coupled and electrically connected to the first electrode terminal by a corresponding one of the coupling members.

That is, in the secondary battery pack according to the present invention, the connection member A protruding from one end of the PCB in the lateral direction is electrically connected and mechanically coupled to the first electrode terminal of the battery cell by a corresponding one of the coupling members. Consequently, it is possible to perform a predetermined assembly process through a simple connection method and to easily manufacture the battery pack, thereby greatly improving manufacturing processability.

Also, the connection member B is electrically connected to the second electrode terminal via the safety element, thereby improving safety of the battery pack. In addition, a conventional battery cell is used to manufacture the battery pack. Consequently, it is possible to greatly improve manufacturing processability of the battery pack without greatly changing the structure of the battery cell.

It is required for the battery case to be easily manufactured and to exhibit a mechanical strength greater than a predetermined level. For this reason, the battery case may be a metal container, preferably an aluminum container or a stainless steel container.

In a preferred example, the first electrode terminal may be a cathode terminal and the second electrode terminal may be an anode terminal. For example, a prismatic battery cell may be configured to have a structure in which an electrode terminal protruding from the top of the battery cell and a battery case form an anode terminal and a cathode terminal, respectively, and an insulative member, such as a gasket, is interposed therebetween, thereby achieving insulation from each other. In such a prismatic battery cell, therefore, the first electrode terminal may be the top of the battery case, i.e. the cathode terminal, and the second electrode terminal may be the anode terminal protruding from the top of the battery case.

Preferably, the coupling grooves are located at opposite ends of the top of the battery case. One of the coupling grooves may be formed at the first electrode terminal. Alternatively, both the two coupling grooves may be formed at the first electrode terminal. However, one of the coupling grooves located at the first electrode terminal is mechanically coupled to the battery cell by a corresponding one of the coupling members, thereby achieving electrical connection with the PCM through the connection member A.

As previously described, the connection member A may be coupled to the bottom of the PCB so that the connection member protrudes from one end of the PCB in the lateral direction in a state in which the connection member A is connected to the circuit of the PCB. The coupling (electrical connection) between the connection member A and the PCB may be achieved in various manners. Preferably, the connection member A is coupled to the bottom of the PCB by soldering.

In a concrete example, the connection member A may include a PCB coupling part coupled to the bottom of the PCB and a battery cell coupling part coupled to the top of the battery cell, and the battery cell coupling part may protrude from one end of the PCB in the lateral direction so that the battery cell coupling part can be exposed through a corresponding one of the through holes of the top cap.

The connection member A is coupled to the battery cell through a corresponding one of the coupling member from above the top cap having a corresponding one of the through holes by the battery cell coupling part protruding from one end of the PCB in the lateral direction, thereby improving manufacturing processability of the battery pack.

Also, a connection terminal connected to the second electrode terminal may be formed at a position of the bottom of the PCB opposite to the connection member A, and the connection member B coupled to the second electrode terminal by welding may be electrically connected to the connection terminal via the safety element. In this structure, the connection member B, included in the PCM together with the safety element, is coupled to the second electrode terminal of the battery cell by welding in a state in which the connection member B is mounted in the insulative cap, thereby achieving electrical connection therebetween. The connection member B is bent so that the connection member is mounted at the top of the battery cell.

In an example, the safety element may be a positive temperature coefficient (PTC) element. The connection member B coupled to the PTC element functions to interrupt the supply of electric current at the top of the battery pack when the interior temperature of the battery pack abruptly increases due to an internal short circuit.

In particular, in the secondary battery pack according to the present invention, the PTC element is directly connected to the connection member B located on the circuit between the battery cell and the PCB. Therefore, the PTC element more sensitively responds to the temperature of the battery cell, thereby greatly improving the safety of the battery pack.

Also, materials for the connection member A and the connection member B are not particularly restricted so long as the connection member A and the connection member B are formed of a conductive material. Preferably, the connection member A and the connection member B are made of nickel plates.

Preferably, an insulation tape is attached to the bottom of the PCB in a state in which portions of the connection members A and B connected to the electrode terminals of the battery cell are exposed. Consequently, the remaining portion excluding the portions of the connection members A and B connected to the electrode terminals of the battery cell may be electrically isolated from the PCM by the insulation tape.

Specifically, in the above structure, the insulation tape may be attached to the remaining portion excluding the battery cell coupling part of the connection member A facing the first electrode terminal and one surface of the connection member B facing the second electrode terminal. Consequently, it is possible to stably achieve electrical connection between the electrode terminals of the battery cell and the PCB while maintaining an overall insulated state.

The coupling members coupled into the coupling grooves of the battery cell through the through holes of the top cap may be various. For example, the coupling members may be screws, to which, however, the coupling members are not limited.

The top cap is coupled to the top of the battery cell and, at the same time, the connection member A is electrically connected to the battery cell through the above coupling, thereby easily achieving assembly of the battery pack and securing more stable coupling.

In a state in which the coupling members are fitted in the through holes, a bonding agent may be injected into through the through holes of the top cap. Alternatively, a sealing member may be inserted into through the through holes of the top cap.

In addition to the insulative top cap coupled to the top of the battery cell, an additional insulative bottom cap may be mounted to the bottom of the battery cell and a sheathing film may be attached to the outside of the battery case of the battery cell. Consequently, it is possible to protect the battery cell against external impact and to maintain the electrical insulation of the battery cell.

In the secondary battery pack according to the present invention, any battery cells may be used in various manners irrespective of the kind and shape of the battery cells. A prismatic lithium secondary battery cell is preferably used.

In accordance with another aspect of the present invention, there is provided a protection circuit module (PCM) assembly mounted to a battery cell configured to have a structure in which an electrode assembly of a cathode/separator/anode structure is mounted in a battery case together with an electrolyte in a sealed state, the battery case is provided at the top thereof with a first electrode terminal, a second electrode terminal and a pair of coupling grooves, the PCM assembly including a PCM including a printed circuit board (PCB) having a protection circuit formed thereon, connection members A and B connected to the first electrode terminal and the second electrode terminal, respectively, and a safety element, and an electrically insulated top cap mounted to the top of the battery cell in a state in which the PCM is mounted in the top cap, the top cap having through holes communicating with the respective coupling grooves, wherein the connection member A is coupled to the bottom of the PCB in a state in which the connection member A protrudes from one end of the PCB in the lateral direction so that a connection portion of the connection member A connected to the first electrode terminal of the battery cell is exposed through a corresponding one of the through holes formed at the top cap, a coupling hole is formed at the protruding portion of the connection member A, and a connection portion of the connection member B connected to the second electrode terminal of the battery cell is located at the bottom of the PCB so that the connection member B is electrically connected to the second electrode terminal via the safety element, and wherein an insulation tape is attached to the bottom of the PCB in a state in which portions of the connection members A and B connected to the electrode terminals of the battery cell are exposed.

In a general assembly process of a battery pack, the PCM is coupled to or disposed at the battery cell, and top cap is mounted to the battery cell. In this way, the PCM assembly is mounted to the battery cell. Consequently, a plurality of welding or soldering processes is required to mount the PCM assembly to the battery cell. As a result, a defect ratio is high and, in addition, a space for assembly and disposition is required.

In the PCM assembly according to the present invention, on the other hand, the connection member B is coupled and bent in a state in which the PCM is mounted in the top cap and the PCM is mounted to the battery cell through coupling using the coupling members, thereby greatly reducing a defect ratio of the connected portions and greatly simplifying the battery pack manufacturing process.

The PCM assembly is new in the art to which the present invention pertains.

In accordance with a further aspect of the present invention, there is provided a method of manufacturing a secondary battery pack including (a) coupling a connection member B to one side of a safety element and attaching an insulation tape to the opposite side of the safety element, (b) coupling the other side of the safety element to the bottom of a printed circuit board (PCB) having a protection circuit formed thereon, (c) coupling a connection member A having a coupling hole formed therein to the bottom of the PCB in a state in which the connection member A protrudes from one end of the bottom of the PCB in the lateral direction to manufacture a protection circuit module (PCM), (d) mounting the PCM in an insulative top cap, (e) attaching an insulation tape to the bottom of the PCM at the remaining portion excluding a portion of the connection member A connected to a first electrode terminal of a battery cell and a portion of the connection member B connected to a second electrode terminal of the battery cell, (f) coupling the connection member B to the second electrode terminal by welding and bending the connection member B to mount a top cap to the top of the battery cell, (g) coupling the top cap to the battery cell by screw coupling to achieve electrical connection and mechanical coupling between the first electrode terminal and the connection member A, (h) coupling an insulative bottom cap to the bottom of the battery cell by bonding, (i) injecting a bonding agent or inserting a sealing member into through holes of the top cap, the through holes of the top cap being configured to have a screw coupling structure and (j) wrapping the outside of the battery pack with a sheathing film.

Consequently, it is possible to reduce the number of manufacturing processes and to manufacture a more compact battery pack as compared with a conventional method of manufacturing a secondary battery pack.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
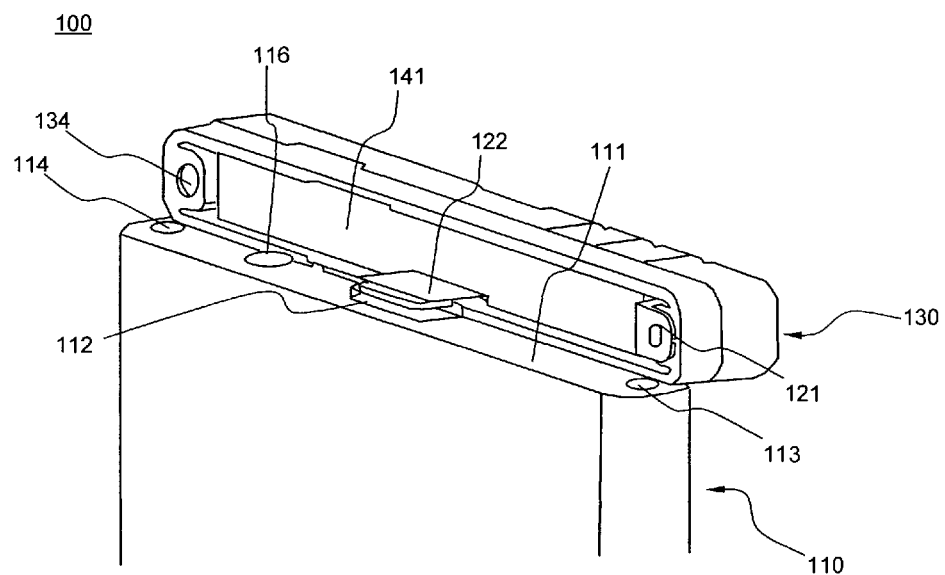
FIG. 1 is an exploded perspective view illustrating the top of a battery cell and an insulative top cap according to an embodiment of the present invention.
Figure 2:
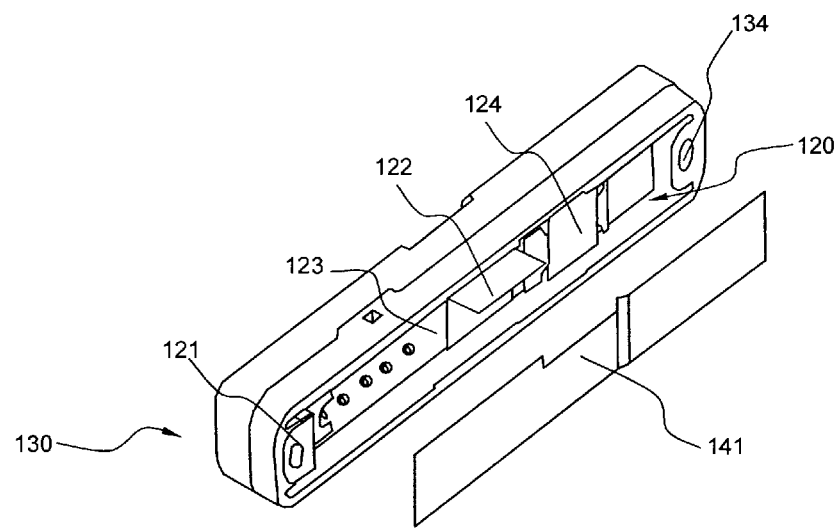
FIG. 2 is a typical view illustrating a protection circuit module (PCM) and an insulation tape mounted in the top cap.

FIG. 1 is an exploded perspective view illustrating the top of a battery cell and an insulative top cap according to an embodiment of the present invention and FIG. 2 is a typical view illustrating a protection circuit module (PCM) and an insulation tape mounted in the top cap.

Referring to these drawings, a secondary battery pack 100 includes a battery cell 110, a protection circuit module (PCM) 120 and a top cap 130 mounted to the top of the battery cell 110 so that the top cap 130 surrounds the PCM 120.

The battery cell 110 is configured to have a structure in which an electrode assembly is mounted in a battery case together with an electrolyte in a sealed state and in which a cathode terminal 111, an anode terminal 112 and a pair of coupling grooves 113 and 114 are formed at the top of the battery case.

The PCM 120 includes a printed circuit board (PCB) 123 having a protection circuit formed thereon, connection members 121 and 122 connected to the cathode terminal 111 and the anode terminal 112, respectively, and a positive temperature coefficient (PTC) element 124.

The top cap 130 is formed of an electrically insulative material. The top cap 130 is provided at opposite ends thereof with through holes 133 and 134 communicating with the coupling grooves 113 and 114, respectively.

An insulation tape 141 is attached to the bottom of the PCB 123 in a state in which the top cap 130 and a portion of the connection member A 121 connected to the cathode terminal 111 are exposed.

The anode terminal 112 is formed at the top of the battery cell 110. The anode terminal 112 protrudes upward in a state in which the anode terminal 112 is isolated from a battery case formed of a metal container. The remaining portion excluding the anode terminal 112 constitutes the cathode terminal 111. The battery cell 110 is provided at one side of the top thereof with an electrolyte injection port 116, which is sealed by a metal ball or a polymer resin.

Figure 3:
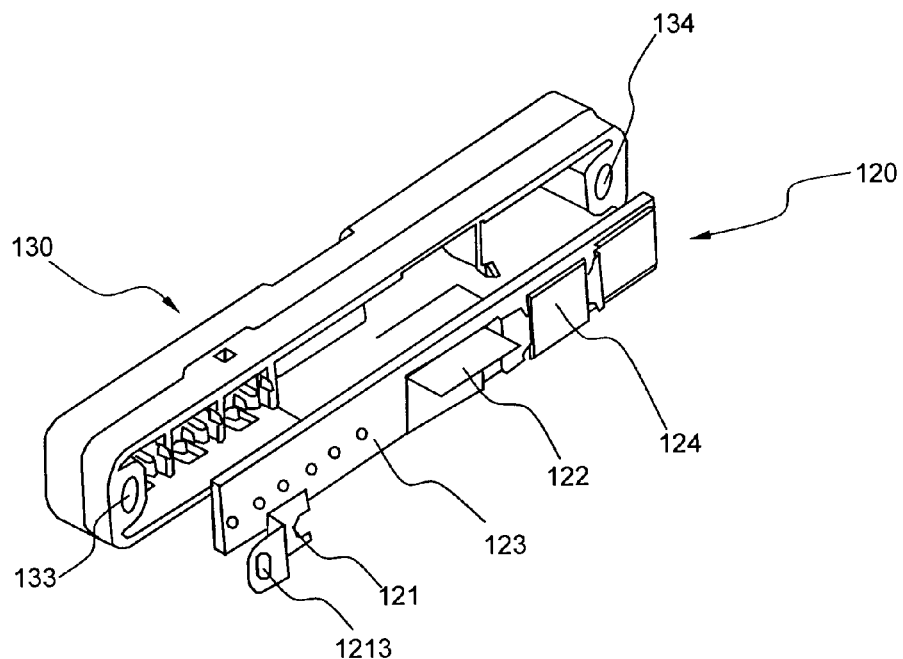
FIG. 3 is an exploded perspective view of FIG. 2.
Figure 4:
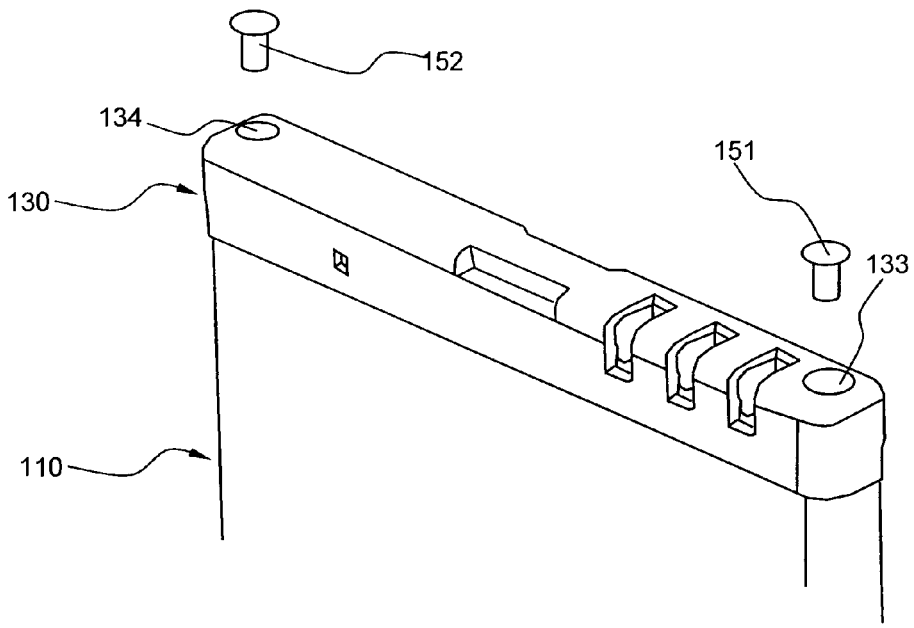
FIG. 4 is a typical view illustrating the insulative top cap and coupling members mounted to the top of the battery cell.
Figure 5:
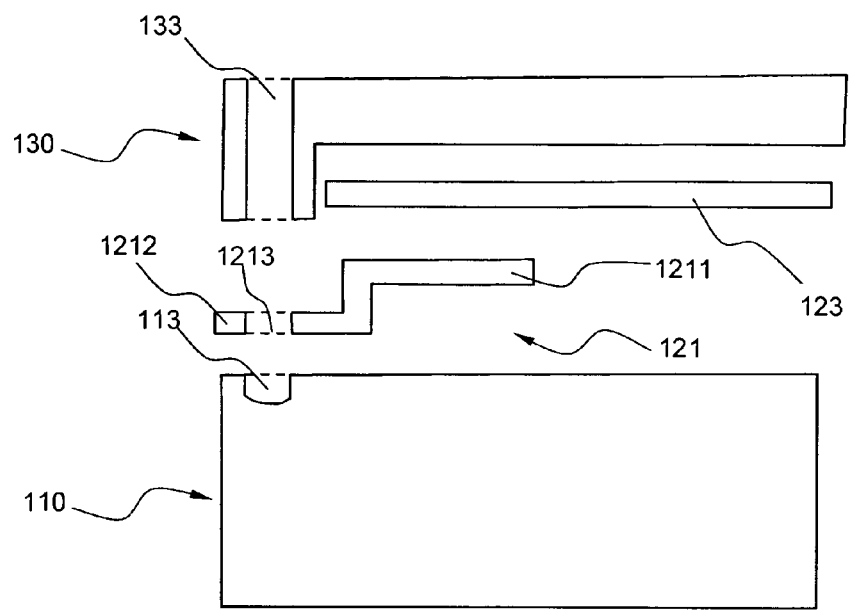
FIG. 5 is a vertical sectional view typically illustrating a connection member A of FIG. 1.

FIG. 3 is an exploded perspective view of FIG. 2, FIG. 4 is a typical view illustrating the insulative top cap and coupling members mounted to the top of the battery cell, and FIG. 5 is a vertical sectional view typically illustrating the connection member A 121 of FIG. 1 coupled to the battery cell.

Referring to these drawings together with FIG. 1, the connection member A 121 includes a PCB coupling part 1211 coupled to the bottom of the PCB 123 and a battery cell coupling part 1212 coupled to the top of the battery cell 110. The battery cell coupling part 1212 protrudes from one end of the PCB 123 in the lateral direction so that the battery cell coupling part 1212 can be exposed through the through hole 133 of the top cap 120.

Consequently, the coupling members 151 and 152 are coupled into the coupling grooves 113 and 114 of the battery cell 110 through the through holes 133 and 134 of the top cap 130 in a state in which the PCM 120 and the top cap 130 are disposed at the top of the battery cell 110. The connection member A 121 is connected to the electrode terminal 111 by the coupling member 151.

As a result, the PCT coupling part 1211 of the connection member A 121 is coupled to the bottom of the PCB 121 by welding, the battery cell coupling part 1212 is electrically connected to the coupling groove 113 formed at the top of the battery cell 110 through physical contact, a coupling member (not shown) is coupled into the coupling groove 113 formed at the top of the battery cell 110 through the through hole 133 of the top cap 130 and a coupling hole 1213 of the connection member A 121, thereby simultaneously achieving mechanical coupling and electrical connection.

Figure 6:
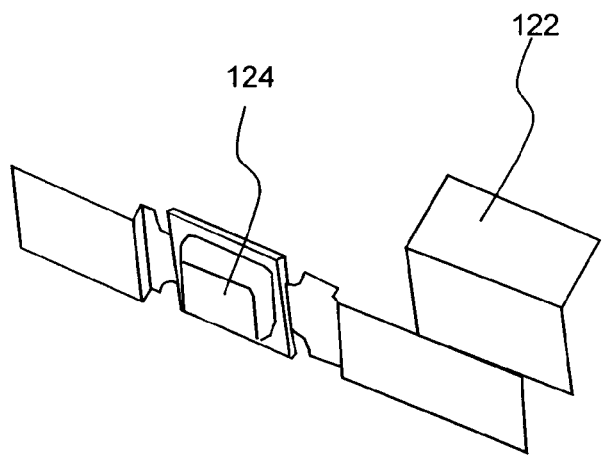
FIG. 6 is an exploded perspective view illustrating a positive temperature coefficient (PTC) element and a connection member B.
Figure 7:
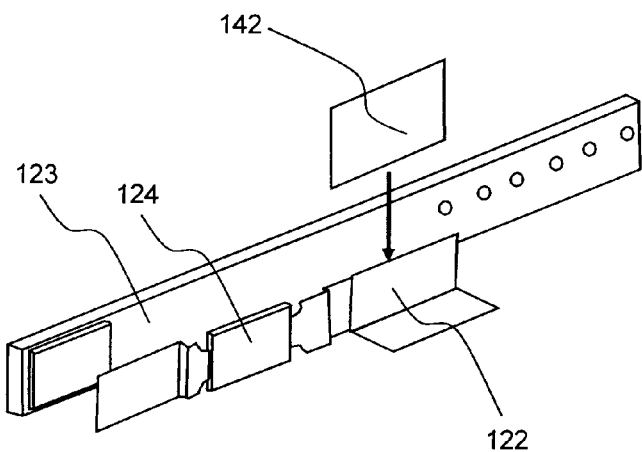
FIG. 7 is an exploded perspective view illustrating the positive temperature coefficient (PTC) element in which the connection member B is coupled to the bottom of a printed circuit board (PCB) and the insulation tape.

FIG. 6 is an exploded perspective view typically illustrating the PTC element and the connection member B and FIG. 7 is an exploded perspective view typically illustrating the PTC element in which the connection member B is coupled to the bottom of the PCB and the insulation tape.

Referring to these drawings together with FIG. 1, the connection member B 122 is coupled to one surface of the PTC element 124 by welding, the insulation tape is attached to the opposite surface of the PTC element 124, and the other surface of the PTC element 124 is coupled to the bottom of the PCB 123 by welding.

That is, the insulation tape is attached to the remaining portion excluding one surface of the connection member B 122 connected to the anode terminal 112 and battery cell connection part of the connection member A 121 and the PCB 123 is electrically connected to the anode terminal 112 of the battery cell 110 via the PTC element 124.

Figure 8:
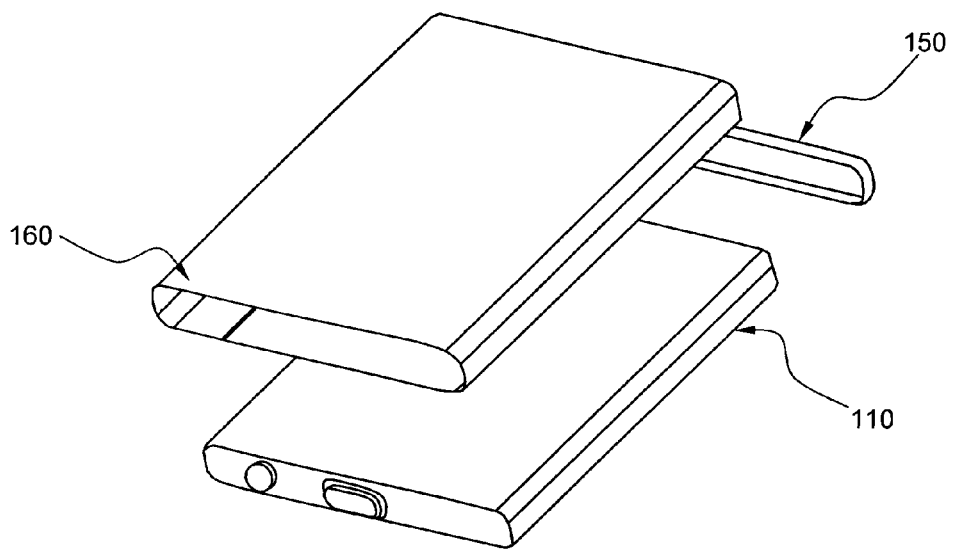
FIG. 8 is an exploded perspective view illustrating the battery cell, a bottom cap and a sheathing film.

FIG. 8 is an exploded perspective view illustrating the battery cell, an insulative bottom cap and a sheathing film.

Referring to FIG. 8, an insulative bottom cap 150 is coupled to the bottom of the battery cell 110 and a sheathing film 160 is attached to the outside of the battery case of the battery cell 110 so that the sheathing film 160 wraps the outside of the battery case of the battery cell 110.

The sheathing film 160 is attached to the outside of the battery case to maintain electrical insulation of the battery cell 110 from the outside and to display product information. The sheathing film 160, made of a thermally shrinkable material, is formed in the shape of a tube. The sheathing film 160 is disposed so as to wrap the battery cell 110, and then heat is applied to the sheathing film 160 so that the sheathing film 160 shrinks and comes into tight contact with the outside of the battery case of the battery cell 110.

INDUSTRIAL APPLICABILITY

As is apparent from the above description, a secondary battery pack according to the present invention is manufactured to have a compact structure through a simple manufacturing process based on a specific structure of a battery cell, a printed circuit board (PCB) and a top cap.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
a battery cell having a top and a bottom and configured to have a structure in which an electrode assembly of a cathode/separator/anode structure is mounted in a battery case together with an electrolyte in a sealed state, a first electrode terminal provided at a top of the battery case, a second electrode terminal and a pair of coupling grooves, one of the coupling grooves is formed at the first electrode terminal, and the second electrode terminal protrudes from a center of the top of the battery case;
a protection circuit module (PCM) comprising a printed circuit board (PCB) having a protection circuit formed thereon, connection members A and B connected to the first electrode terminal and the second electrode terminal, respectively, and a safety element; and
an electrically insulated top cap mounted to the top of the battery cell so as to surround the PCM, the top cap having through holes communicating with the respective coupling grooves, wherein
the connection member A is coupled to a bottom of the PCB in a state in which the connection member A protrudes from one end of the PCB in a lateral direction so that a connection portion of the connection member A connected to the first electrode terminal of the battery cell protrudes through a corresponding one of the through holes formed at the top cap, a coupling hole is formed at the protruding portion of the connection member A, and a connection portion of the connection member B connected to the second electrode terminal of the battery cell is located at the bottom of the PCB so that the connection member B is electrically connected to the second electrode terminal via the safety element, and wherein
coupling members are coupled into the respective coupling grooves of the battery cell through the through holes of the top cap in a state in which the PCM and the top cap are disposed at the top of the battery cell, and the connection member A is mechanically coupled and electrically connected to the first electrode terminal by a corresponding one of the coupling members.

2. The secondary battery pack according to claim 1, wherein battery case is a metal container.

3. The secondary battery pack according to claim 1, wherein the first electrode terminal is a cathode terminal and the second electrode terminal is an anode terminal.

4. The secondary battery pack according to claim 1, wherein the coupling grooves are located at opposite ends of the top of the battery case.

5. The secondary battery pack according to claim 1, wherein the connection member A is coupled to the bottom of the PCB by soldering.

6. The secondary battery pack according to claim 1, wherein the connection member A comprises a PCB coupling part coupled to the bottom of the PCB and a battery cell coupling part coupled to the top of the battery cell, the battery cell coupling part protruding from one end of the PCB in the lateral direction so that the battery cell coupling part can be exposed through a corresponding one of the through holes of the top cap.

7. The secondary battery pack according to claim 1, wherein a connection terminal connected to the second electrode terminal is formed at a position of the bottom of the PCB opposite to the connection member A, and the connection member B coupled to the second electrode terminal by welding is electrically connected to the connection terminal via the safety element.

8. The secondary battery pack according to claim 1, wherein the safety element is a positive temperature coefficient (PTC) element.

9. The secondary battery pack according to claim 1, wherein the connection member A and the connection member B are made of nickel plates.

10. The secondary battery pack according to claim 1, wherein an insulation tape is attached to the bottom of the PCB in a state in which portions of the connection members A and B connected to the electrode terminals of the battery cell are exposed.

11. The secondary battery pack according to claim 10, wherein the insulation tape is attached to the remaining portion excluding the battery cell coupling part of the connection member A facing the first electrode terminal and one surface of the connection member B facing the second electrode terminal.

12. The secondary battery pack according to claim 1, wherein the coupling members are screws.

13. The secondary battery pack according to claim 1, further comprising a sheathing film attached to the outside of the battery case of the battery cell.

14. The secondary battery pack according to claim 1, wherein the battery cell is a prismatic lithium secondary battery cell.

15. A protection circuit module (PCM) assembly mounted to a battery cell having a top and a bottom and configured to have a structure in which an electrode assembly of a cathode/separator/anode structure is mounted in a battery case together with an electrolyte in a sealed state, a first electrode terminal provided at a top of the battery case, a second electrode terminal and a pair of coupling grooves, the PCM assembly comprising:
a PCM comprising a printed circuit board (PCB) having a protection circuit formed thereon, connection members A and B connected to the first electrode terminal and the second electrode terminal, respectively, and a safety element; and
an electrically insulated top cap mounted to the top of the battery cell in a state in which the PCM is mounted in the top cap, the top cap having through holes communicating with the respective coupling grooves, wherein
the connection member A is coupled to a bottom of the PCB in a state in which the connection member A protrudes from one end of the PCB in the lateral direction so that a connection portion of the connection member A connected to the first electrode terminal of the battery cell is exposed through a corresponding one of the through holes formed at the top cap, a coupling hole is formed at the protruding portion of the connection member A, and a connection portion of the connection member B connected to the second electrode terminal of the battery cell is located at the bottom of the PCB so that the connection member B is electrically connected to the second electrode terminal via the safety element, and wherein
an insulation tape is attached to the bottom of the PCB in a state in which portions of the connection members A and B connected to the electrode terminals of the battery cell are exposed.

16. A method of manufacturing a secondary battery pack comprising:
(a) coupling a connection member B to one side of a safety element and attaching an insulation tape to an opposite side of the safety element;

(b) coupling the opposite side of the safety element to a bottom of a printed circuit board (PCB) having a protection circuit formed thereon;
(c) coupling a connection member A having a coupling hole formed therein to the bottom of the PCB in a state in which the connection member A protrudes from one end of the bottom of the PCB in the lateral direction to manufacture a protection circuit module (PCM);
(d) mounting the PCM in an insulative top cap;
(e) attaching an insulation tape to a bottom of the PCM at the remaining portion excluding a portion of the connection member A connected to a first electrode terminal of a battery cell and a portion of the connection member B connected to a second electrode terminal of the battery cell;
(f) coupling the connection member B to the second electrode terminal by welding and bending the connection member B to mount a top cap to a top of the battery cell;
(g) coupling the top cap to the battery cell by screw coupling to achieve electrical connection and mechanical coupling between the first electrode terminal and the connection member A;
(h) coupling an insulative bottom cap to a bottom of the battery cell by bonding;
(i) injecting a bonding agent or inserting a sealing member into through holes of the top cap, the through holes of the top cap being configured to have a screw coupling structure; and
(j) wrapping an outside of the battery pack with a sheathing film.

* * * * *